United States Patent
Fairfax et al.

(10) Patent No.: US 9,702,674 B2
(45) Date of Patent: Jul. 11, 2017

(54) METHOD AND APPARATUS FOR GPS-DENIED NAVIGATION OF SPIN-STABILIZED PROJECTILES

(71) Applicant: U.S. Army Research Laboratory ATTN: RDRL-LOC-I, Adelphi, MD (US)

(72) Inventors: Luisa D. Fairfax, Baltimore, MD (US); Frank E. Fresconi, Newark, DE (US); James M. Maley, Abingdon, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 355 days.

(21) Appl. No.: 14/454,250

(22) Filed: Aug. 7, 2014

(65) Prior Publication Data
US 2016/0349026 A1 Dec. 1, 2016

(51) Int. Cl.
*G01C 23/00* (2006.01)
*F42B 10/26* (2006.01)
*F41G 7/00* (2006.01)

(52) U.S. Cl.
CPC .............. *F42B 10/26* (2013.01); *F41G 7/006* (2013.01); *F41G 7/008* (2013.01)

(58) Field of Classification Search
CPC .................................. F42B 10/26; F41G 7/00
USPC ................... 701/3, 469, 472, 457, 478, 480; 342/357.36, 357.31, 357.59
See application file for complete search history.

(56) References Cited

U.S. PATENT DOCUMENTS

| 7,121,502 | B2 * | 10/2006 | Krikorian | F41G 7/303 244/3.1 |
|---|---|---|---|---|
| 9,207,328 | B2 * | 12/2015 | Frey, Jr. | G01S 19/18 |
| 2004/0188561 | A1 * | 9/2004 | Ratkovic | F41G 7/346 244/3.15 |
| 2005/0040280 | A1 * | 2/2005 | Hua | F42B 15/01 244/3.1 |
| 2012/0104150 | A1 * | 5/2012 | Elgersma | G01C 21/165 244/3.21 |
| 2015/0105946 | A1 * | 4/2015 | Kumar | B64C 39/024 701/3 |

OTHER PUBLICATIONS

Fairfax, Luisa D., Frank E. Fresconi—"Position Estimation for Projectiles Using Low-Cost Sensors and Flight Dynamics", Journal of Aerospace Engineering 27.3 (2012); pp. 611-620.
Fresconi, F.; Cooper, G.R.; Celmins, I.; DeSpirito, J.; Costello, M.; Flight Mechanics of a Novel Guided Spin-Stabilized Projectile Concept; Journal of Aerospace Engineering 2011; vol. 226; Part G; pp. 327-340.
Luisa D. Fairfax and Frank E. Fresconi, "Position Estimation for Projectiles Using Low-cost Sensors and Flight Dynamics," Army Research Laboratory technical Report, ARL-TR-5994. Apr. 2012.

* cited by examiner

*Primary Examiner* — Thomas G Black
*Assistant Examiner* — Luke Huynh
(74) *Attorney, Agent, or Firm* — Eric Brett Compton

(57) ABSTRACT

A method and apparatus is provided that provides accurate navigation for spin-stabilized projectiles in a GPS-denied environment using low cost measurement sensors, by application of flight dynamics in real-time state estimation algorithms.

20 Claims, 12 Drawing Sheets

METHOD AND APPARATUS FOR GPS-DENIED NAVIGATION OF SPIN-STABILIZED PROJECTILES

GOVERNMENT INTEREST

Governmental Interest—The invention described herein may be manufactured, used and licensed by or for the U.S. Government.

FIELD OF INVENTION

Embodiments of the present invention generally relate to navigation of spin-stabilized platforms in atmospheric flight and, more particularly, to a method and apparatus for GPS-denied navigation of spin-stabilized projectiles.

BACKGROUND OF THE INVENTION

GPS has been applied with much success to guided projectiles. The overwhelming capabilities of GPS guided projectiles yields an overreliance on the GPS system. Due to the possibility of natural and man-made threats to the availability of GPS technologies to remain fully functional and properly operating during navigation, provision must be made for GPS-denied navigation of spin-stabilized projectile munitions, especially in the battlefield environment.

GPS systems provide navigation data (i.e., position, velocity, time) required by the guidance and flight control systems of projectiles for successful course correction to a target. A gun-launched environment often makes it difficult to collect quality data from alternate (i.e., non-GPS) feedback sources, such as inertial sensors, seekers, or data links. The physical forces generated by a gun launch may alter the basic functionality of sensor devices, which then obfuscates ground calibration. Additionally, spin-stabilized projectiles rotate hundreds or thousands of times per second, which severely stresses the dynamic range and integration of sensors such as accelerometers and gyroscopes. Component survivability and operational performance of onboard spin-stabilized projectiles are also major concerns since quality measurement data is required for accurate navigation. Lastly, cost is a major factor since ballistic projectiles are relatively inexpensive and it would be desirable to develop a low-cost solution for accurate navigation in a GPS-denied environment. The overall cost of a navigation system is often driven by the measurements required to develop input for the navigation system. The use of micro-electromechanical (MEM) accelerometers as low-cost measurement sensors is desirable, but such sensors often feature higher noise characteristics than more expensive accelerometer technologies. Additionally, unduly high labor cost is sometimes required to calibrate these measurement technologies into a final integrated flight vehicle.

Therefore there is a need in the art for a relatively low-cost GPS-denied navigation system for spin-stabilized projectiles.

BRIEF SUMMARY OF THE INVENTION

Embodiments of the present invention relate to a method and apparatus that can provide accurate navigation for spin-stabilized projectiles in a GPS-denied environment using low cost measurement devices, by application of flight dynamics in real-time state estimation algorithms. More specifically, embodiments described herein consider the full state estimation problem (that is, including attitude estimation) with high fidelity modeling while addressing the unique challenges of using low-cost sensors in the environment of a spin-stabilized projectile in atmospheric flight.

Embodiments of the present invention also relate to a method and apparatus which uses the high fidelity modeling for developing a dynamic prediction of position and velocity and an inertial prediction of position and velocity. The dynamic and inertial predictions are then blended in an optimal manner to obtain an accurate estimated position and velocity of the spin-stabilized platform in atmospheric flight.

Embodiments of the present invention also relate to a method and apparatus which compensate for measurement errors caused by use of the low-cost sensors and minimal ground calibration, by use of in-flight nuisance parameter estimation which applies measurement modeling and estimation algorithms in an extended Kalman filter.

Embodiments of the present invention also relate to a method and apparatus where nuisance parameter estimators are used to correct raw sensor outputs by estimating their dominant error terms. The dominant error terms in each sensor output are determined to be a constant bias and a constant times the square of the spin-rate of the spin-stabilized platform.

These and other features and advantages of the present disclosure may be appreciated from a review of the following detailed description, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
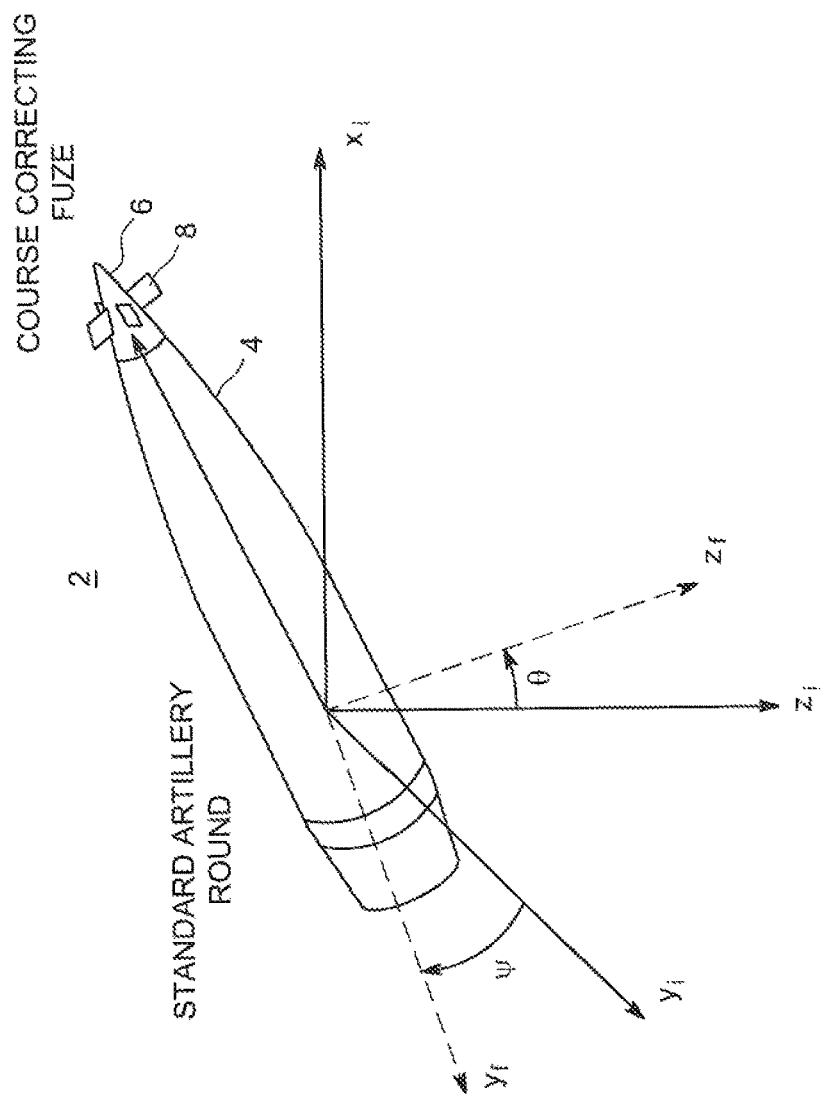
FIG. 1 illustrates the relationship between a fixed-plane coordinate frame and an inertial-plane coordinate frame, for a fuze-guided, spin-stabilized projectile including GPS-denied navigation apparatus, in accordance with exemplary embodiments of the present invention.

Embodiments of the present invention relate to a method and apparatus that can provide accurate navigation for spin-stabilized projectiles in a GPS-challenged environment using low cost measurement devices, by application of flight dynamics in real-time state estimation algorithms. Although aiding inertial navigation with flight dynamics is known for aircraft and fin-stabilized projectiles, the present embodiments use high fidelity modeling and simulation to address the unique challenges of using low-cost sensors in the environment of a spin-stabilized platform in atmospheric flight, and also considers the full state estimation problem (that is, including attitude estimation).

Accelerometer measurement errors due to use of low-cost devices and minimal ground calibration significantly affect inertial navigation performance in a spin-stabilized projectile munition in the ballistic environment. Embodiments of the present invention compensate for the low-cost accelerometer measurement errors and minimal ground calibration using in-flight nuisance parameter estimation which applies measurement modeling and estimation algorithms.

Embodiments of the present invention compensate for these nuisance parameters by leveraging the spin-stabilized projectile flight dynamics and sensor modeling in an extended Kalman filter. Nonlinear modeling and practical simplification of in-flight measurements results in a novel estimator algorithm that improves navigation accuracy by three orders of magnitude, and under certain conditions is sufficient to increase overall system precision over the ballistic performance for munitions in a GPS-denied environment.

Embodiments of the invention are described herein in the environment of adding course-correcting fuzes to stockpiled projectile ammunition, which is an attractive means for improving munition effectiveness. A particular course-correcting fuze, referred to as the Precision Guidance Kit (PGK), uses GPS for navigation and employs four (4) canards equally spaced in roll angle which are de-coupled from the projectile body in the roll axis. As noted above, one use of the present invention is to enable accurate navigation of such munitions in a GPS-denied environment.

In the following description, models of the projectile are provided along with details regarding the aided inertial navigation system. In particular, the algorithms for estimating the atmosphere, aerodynamics, attitude, accelerometer signals, and position and velocity of the projectile are described. In order to ensure a clear understanding of the invention, reference is made to the following lists in conjunction views of the projectile as shown in FIG. 1 and FIGS. 2A, 2B and 2C:

LIST OF SYMBOLS, ABBREVIATIONS, AND ACRONYMS

AIN aided inertial navigation
ARL U.S. Army Research Laboratory
CEP circular error probable
CG center of gravity
COTS commercial-off-the-shelf
EB error budget
GPS Global Positioning System
EKF extended Kalman filter
MET meteorological
NP nuisance parameter(s)
PWM pulse-width modulation
SSKF stead state kalman filter Nomenclature $BW_{NE}$, $BW_{3dB}$ Noise-equivalent bandwidth and low-pass filter bandwidth [Hz]
$C_{X_a}$ zero AOA x-axis force coefficient $C_{X_{a^2}}$ AOA squared x-axis force coefficient $C_{Y_{p\alpha}}$ Magnus force coefficient
$C_{N_\alpha}$ Normal force coefficient slope $C_{N_{\alpha^3}}$ Pitch cubed normal force coefficient $C_{Y_{\alpha_C}}$ Canard static side force coefficient $C_{Z_{0_C}}$ Canard normal force coefficient $F_x^f$, $F_y^f$, $F_z^f$ Fixed-plane x, y, and z components of aerodynamic force
D, A Projectile reference length [m] and reference area [m²]
$\tilde{R}$, $\tilde{\dot{R}}$, $\tilde{Az}$, $\tilde{El}$ Measurements of range, range-rate, azimuth angle, and elevation angle from radar
$a_{FSV}$ Accelerometer full scale value [g's]
$a_{balloting}$, $a_{drag}$ Maximum accelerations due to balloting motion and drag [g's]
$a_c$ Centripetal acceleration [g's]
$a_{filt}$ Filtered radial acceleration, either y or z axis [g's]
$a_x^b$, $a_y^b$, $a_z^b$ Acceleration components of the accelerometer triad viewed in body-fixed coordinates [g's]
$a_{yz}$ Radial acceleration, either y or z axis [g's]
$c_{max}$ Maximum percentage of radial acceleration seen by axial accelerometer [%]
$e_k$ Scalar component of GPS error at time k [m, m/s]
m Projectile mass [kg]
$n_{\tilde{R}}$, $n_{\tilde{\dot{R}}}$, $n_{\tilde{Az}}$, $n_{\tilde{El}}$ Random errors in range, range-rate, azimuth angle, and elevation angle measurements from radar p, q, r x, y, and z components of fixed-plane frame angular velocity ($\omega_{fji}^f$) [Hz, or rad/sec]

$p_b$ Spin rate (x-component of $\omega_{bji}^b$) [Hz, or rad/sec]

$p_N$ Nose section spin rate [Hz, or rad/sec]

$p_{max}$ Maximum spin rate [Hz]

$\bar{q}$ Dynamic pressure [N/m$^2$]

$t_{acq}$, $t_{jam}$ Time of GPS acquisition and jamming [sec]

$t_r$ Time when radar becomes unavailable [sec]

$u_k$ Unit white sequence $B_k$ Mapping from the errors in the nuisance parameter estimates to errors in body-fixed accelerations L Estimator gain for blending accelerometer and dynamic model predictions $K_\eta$ Kalman gain for estimating NP errors from GPS/Radar updates $R_a^b$ Rotation matrix from frame $_a$ to frame $_b$ $S_a$, $b_a$, $n_a$, $d_a$ Accelerometer calibration matrix, bias vector, noise vector, and drift bias $S_m$, $b_m$, $n_m$ Magnetometer calibration matrix, bias vector, and noise vector $P_k$ Covariance of the position/velocity state estimate at time step k $P_{k,d}^-$, $P_{k,a}^-$, $P_{k,c}^-$ Covariance of the position/velocity prediction errors from the dynamic model, acceleration integration model, and combination at time step k $P_{n,k}$ Covariance of the NP state estimate at time step k $Q_{k-1}^k$ Process noise covariance from time step k−1 to k $a_{a/i}^b$, ã True and measured acceleration of the accelerometer triad [m/s$^2$]

$e_{GPS}$ Vector of GPS errors [m, m/s]

g' Plumb-bob gravity vector $m^b$, m̂ True and measured magnetic field in body coordinates [Gauss]

$r_{a/b}^c$ Position of frame $_a$ with respect to frame $_b$ viewed in frame $_c$ coordinates [m]

$r_{f/g}^g$ Position of the projectile CG [m]

$v_{a/b}^c$ Velocity of frame $_a$ with respect to frame $_b$ viewed in frame $_c$ coordinates [m/s]

$v_{f/g}^g$ Velocity of the projectile CG [m]

$\tilde{r}_{GPS}$, $\tilde{v}_{GPS}$ Position [m] and velocity [m/s] measured by GPS $q_g^f$ Quaternion describing rotation from gun-frame to fixed-plane frame $\hat{x}_{k,d}^-$, $\hat{x}_{k,a}^-$, $\hat{x}_{k,c}^-$ Predictions of the position/velocity from the dynamic model, acceleration integration model, and combination at time step k $x_B$, $x_N$ Body and Nose section state vectors γ Coriolis acceleration $\omega_{a/b}^c$ Angular velocity of frame a with respect to frame b viewed in frame c coordinates [rad/s]

η Accelerometer NP vector

ξ Attitude estimator state vector $\omega_{f/g}^f$ Angular velocity of the fixed-plane reference frame [rad/sec]

Δt Time between aided navigation system iterations [sec]

$\Delta t_{GPS}$ Time between GPS updates [sec]

$\Delta y_{max}$ Maximum allowable accelerometer position offset from spin-axis [mm]

$\Phi_{k-1,d}^k$, $\Phi_{k-1,n}^k$ State transition matrix from time step k−1 to k of dynamic model and acceleration integration model α,β Angle of attack and Sideslip [rad]

$\bar{\alpha}$, $\alpha_C$ Total angle of attack and Canard angle of attack [rad]

$\epsilon_c$ Accelerometer position offset from spin-axis [mm]

$\rho_w$ Accelerometer noise density [mg/√Hz]

$\phi_n$ Nose-section roll angle [rad]

φ, θ, ψ Euler angles describing the body-frame orientation relative to the gun-frame [rad]

$\sigma_{GM}$, $\beta_{GM}$ GPS error model Gauss-Markov noise and time correlation terms $\sigma_{RMS}$ Accelerometer noise standard deviation [mg]

$\sigma_{RMS_{EQ}}$ Equivalent accelerometer noise standard deviation after correcting for filter magnitude response [mg]

FIG. 1 illustrates a projectile/PGK combination so as to provide an exemplary environment for the present description. The projectile considered here is a standard spin-stabilized artillery shell 2 having a body section 4 with its standard fuze section replaced by a course-correcting fuze section 6 equipped with four equally-spaced canards 8. The basic concept is that the fuze section 6 spins relative to the body section 4, so that the canards 8 can be held at a constant roll angle with respect to inertial space. This generates aerodynamic forces and moments that serve to steer the projectile 2 enough to provide minor course corrections. One pair of canards features cant for spinning a portion of the fuze assembly opposite the direction of the projectile body spin. Another pair is selectively deflected so as to enable lateral maneuverability. In this manner, the roll orientation may be controlled by applying an electromagnetic field to essentially brake the roll-inducing canard effects at a particular roll orientation for effecting a lateral maneuver. When the fuze is freely spinning, the aerodynamic asymmetry produced by the twin deflected canards is effectively averaged out over the spin cycle.

The position of the projectile 2 is described herein with respect to an Earth-fixed North-East-Down inertial reference frame. Although coriolis accelerations are used in the position equations of motion, the rotation of the Earth is generally neglected and the Earth frame is assumed to be an inertial frame (−i). The flight dynamics are developed in the typical way using a fixed-plane (−f) coordinate system. As known, this coordinate system is rigidly attached to the spin axis of projectile 2, but not the rest of the projectile body. Therefore, the −f coordinate system is rotated through the projectile azimuth angle ψ, followed by the projectile elevation angle θ, but not through the projectile roll angle φ. As a result of this rotation sequence, the −f frame y-axis never departs from the −i frame x-y plane, which is why it is called the "fixed-plane" coordinate system Because spin-stabilized projectiles are axially symmetric (the projectile can be rolled to any angle and look identical), the aerodynamic forces and moments are conveniently expressed in the −f coordinate system without loss of generality. These two main coordinate systems are also displayed in FIG. 1.

Figure 2C:
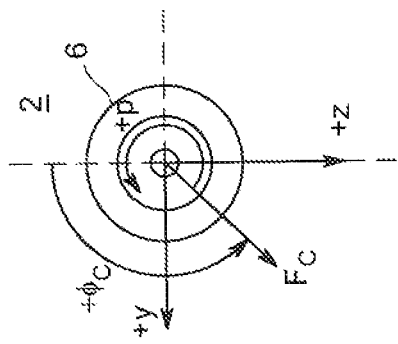
FIGS. 2A, 2B and 2C depict in a top view, a side view and a front view, respectively, propagation of the velocity vector in fixed-plane (−f) coordinates for the projectile of FIG. 1, in accordance with exemplary embodiments of the present invention.
Figure 2A:
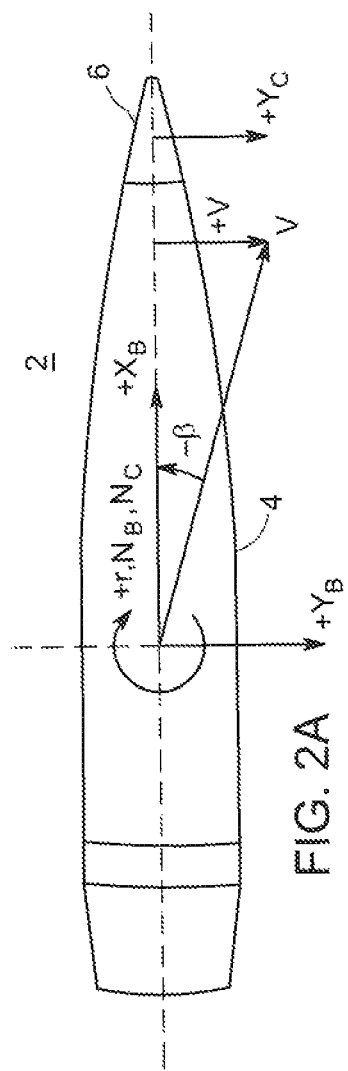
Figure 2B:
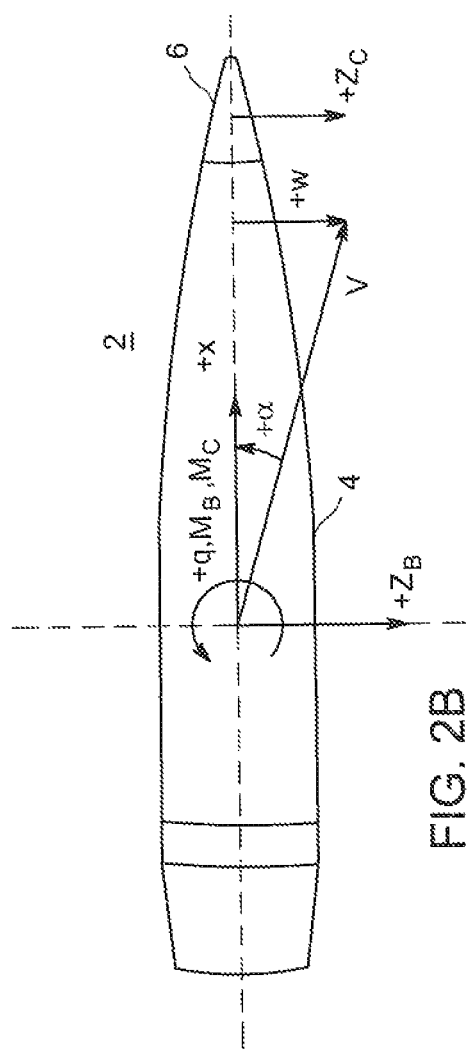

FIGS. 2A, 2B and 2C depict in a top view, a side view and a front view, respectively, propagation of the velocity vector in fixed-plane (−f) coordinates for the projectile of FIG. 1, in accordance with exemplary embodiments of the present invention.

The following simplified equations of motion describe the propagation of the projectile's velocity vector in fixed-plane (−f) coordinates:

$$\dot{u} = g\sin(\theta) - qw + rv + \frac{X_B + X_C}{m} \quad (1)$$

$$\dot{v} = -ru - rw\tan(\theta) + \frac{Y_B + Y_C}{m}$$

$$\dot{w} = -g\cos(\theta) + rv\tan(\theta) + qu + \frac{Z_B + Z_C}{m}$$

Where the aerodynamic forces acting on the main projectile are given by:

$$X_B = \bar{q}A(C_{X_0} + C_{X_{\alpha^2}}\bar{\alpha}^2) \quad (2)$$

$$Y_B = \bar{q}A\left(-C_{N_\alpha}\sin^{-1}\left(\frac{v}{V}\right) + C_{Y_{p\alpha}}\frac{p_b d}{2V}\sin^{-1}\left(\frac{w}{V}\right)\right)$$

$$Z_B = \bar{q}A\left(-C_{N_\alpha}\sin^{-1}\left(\frac{w}{V}\right) - C_{Y_{p\alpha}}\frac{p_b d}{2V}\sin^{-1}\left(\frac{v}{V}\right)\right)$$

and where $\bar{\alpha} = \sin^{-1}\left(\sqrt{\frac{v^2+w^2}{V^2}}\right)$ and $\bar{q} = \frac{1}{2}\rho V^2$.

The aerodynamic forces acting on the canards are given by:

$$X_C = \bar{q}A(C_{X_{0C}}) \quad (3)$$

$$Y_C = \bar{q}A(C_{Z_{0C}}\sin(\phi_C) + C_{Y_{\alpha_C}}\alpha_C\cos(\phi_C))$$

$$Z_C = \bar{q}A(-C_{Z_{0C}}\cos(\phi_C) + C_{Y_{\alpha_C}}\alpha_C\sin(\phi_C))$$

where, $\alpha_C = \sin^{-1}\left(\frac{w\cos(\phi_C) - v\sin(\phi_C)}{V}\right)$.

The fixed-plane angular velocity equations of motion are given by:

$$\dot{p}_b = \frac{L_B + L_C}{I_X} \quad (4)$$

$$\dot{q} = -r^2\tan(\theta) - \frac{I_X}{I_Y}rp_b + \frac{M_B + M_C}{I_Y}$$

$$\dot{r} = qr\tan(\theta) + \frac{I_X}{I_Y}qp_b + \frac{N_B + N_C}{I_Y}$$

The aerodynamic moments acting on the main projectile are given by:

$$L_B = \bar{q}Ad\left(C_{l_p}\frac{p_b d}{2V}\right) \quad (5)$$

$$M_B = \bar{q}Ad\left(C_{m_\alpha}\sin^{-1}\left(\frac{w}{V}\right) + C_{m_q}\frac{qd}{2V} + C_{n_{p\alpha}}\frac{p_b d}{2V}\sin^{-1}\left(\frac{v}{V}\right)\right)$$

$$N_B = \bar{q}Ad\left(-C_{m_\alpha}\sin^{-1}\left(\frac{v}{V}\right) + C_{m_q}\frac{rd}{2V} + C_{n_{p\alpha}}\frac{p_b d}{2V}\sin^{-1}\left(\frac{w}{V}\right)\right)$$

where:

$$C_{m_\alpha} = (CG - CP)C_{N_\alpha} \quad (6)$$

$$C_{n_{p\alpha}} = (CG - CP_M)C_{Y_{p\alpha}} \quad (7)$$

The aerodynamic moments acting on the canards are given by:

$$M_C = \bar{q}Ad((CG - CP_Z)C_{Z_{0C}}\cos(\phi_C) - (CG - CP_Y)C_{Y_{\alpha_C}}\alpha_C\sin(\phi_C)) \quad (8)$$

$$N_C = \bar{q}Ad((CG - CP_Z)C_{Z_{0C}}\sin(\phi_C) + (CG - CP_Y)C_{Y_{\alpha_C}}\alpha_C\cos(\phi_C))$$

There is no significant x-axis moment from the canards due to aerodynamics, but there are moments due to bearing friction and control torques. These are neglected in the development of the estimator.

In order to evaluate the performance of the navigation methods and apparatus described herein and their effects on the accuracy of projectile navigation, a system simulation was created using a computer application that operates to provide a programming tool for modeling, simulating and analyzing dynamic systems. One such computer application is Simulink® (MATLAB version 8.1.0. Natick, Mass.: The Mathworks Inc., 2013).

Figure 12:
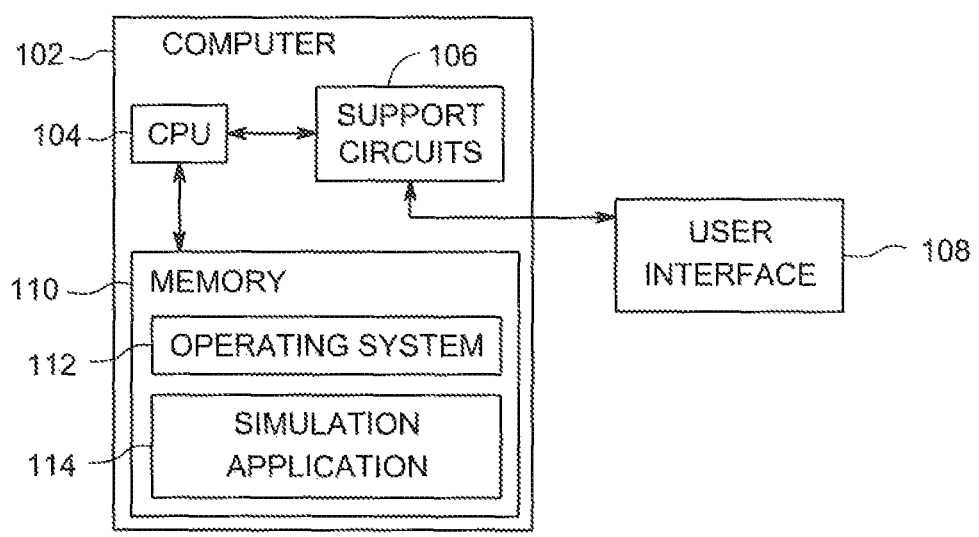
FIG. 12 illustrates a general purpose computer having a simulation application installed thereon which provides a programming tool to model, simulate and analyze dynamic systems.

FIG. 12 illustrates a general purpose computer 102, such as a desktop computer, a laptop, a tablet computer, or the like. The computer 102 includes a Central Processing Unit (CPU) 104, support circuits 106, a user interface 108 and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The user interface facilitates communication by a user with computer 102 for controlling its operation by providing input of information, in the form of instructions, applications and the like, to the computer 102, as well to receive output of information from computer 102. User interface 108 may comprise a video and/or audio display, a keyboard, as well as printer or the like. In some embodiments, one or more functionalities of the user interface 108 are built into the apparatus 102, such as in cases in which the apparatus 102 is touch enabled device. The memory 110 includes at least one of a Read Only Memory (ROM), a Random Access Memory (RAM), a disk drive storage, an optical storage, a removable storage and/or the like.

The memory 110 includes at least an operating system 112 and a simulation application 114 installed therein. The operating system 112 may include various commercially known operating systems. The simulation application 114 includes the forenoted Simulink computer application for modeling, simulating and analyzing dynamic systems, as described in the following Figures illustrating various simulations.

Figure 3:
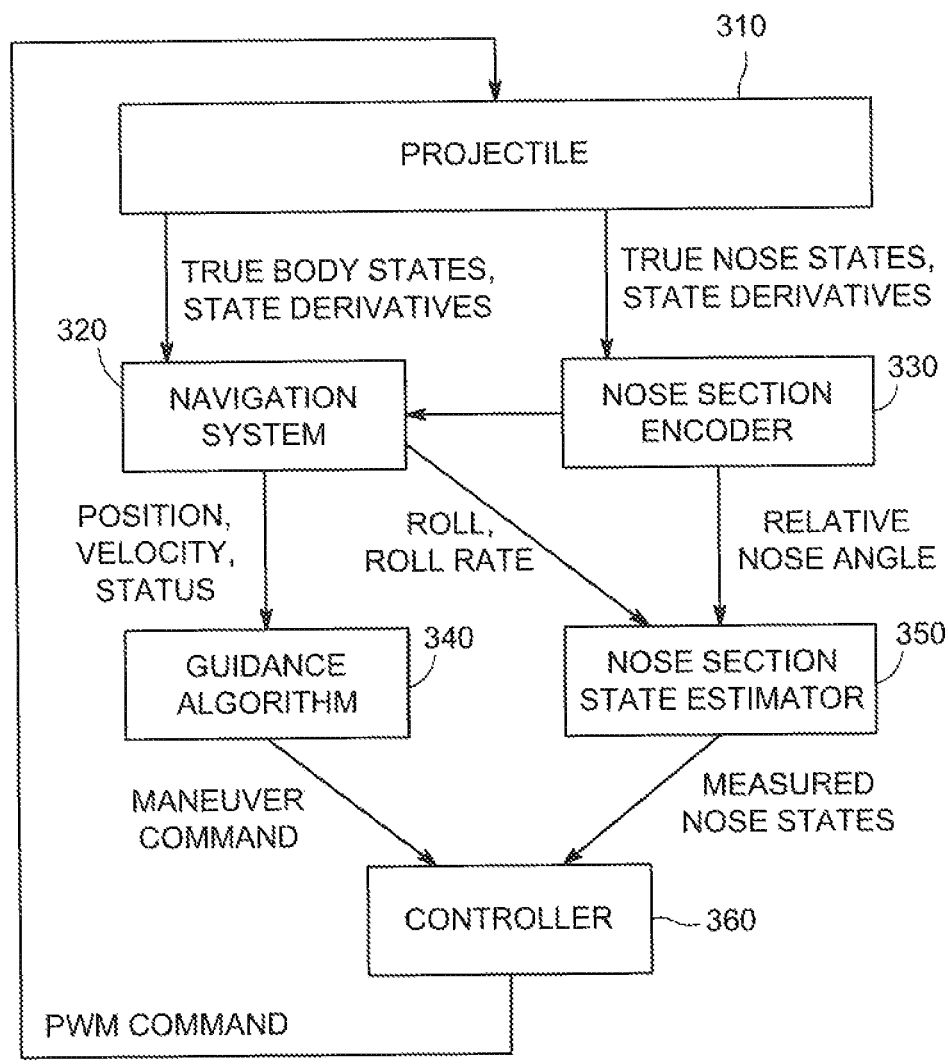
FIG. 3 illustrates a top level block diagram of the simulation of the projectile of FIG. 1 in combination with projectile navigation apparatus in accordance with exemplary embodiments of the present invention.

A top level illustration of a simulation running on computer 102 is shown in FIG. 3 and includes a simulated projectile 310, a simulated navigation system 320, a simulated nose section encoder 330, a guidance algorithm 340, a nose section state estimator 350, and a simulated controller 360. The simulated projectile 310 integrates the equations of motion in order to generate a state trajectory (i.e. position, velocity, angular rate, attitude), and these states are used as a truth source against which to compare estimated states produced by the simulated navigation system 320. The simulated projectile 310 also generates true roll angle and roll rate states of the nose section. The simulated nose section encoder 330 along with the simulated nose section state estimator 350 simulate how the relative nose section roll angle is measured in reality, and how that measurement is used with the projectile roll angle measurement to obtain an estimate of nose section roll angle.

The guidance algorithm 340 accepts estimates from the navigation system 320 of the position and velocity of the projectile relative to the target, and calculates the necessary Maneuver Command that is applied to the simulated controller 360 for intercept. The simulated navigation system 320 also provides a status that indicates to the guidance algorithm 340 whether or not there is a valid navigation solution. If, for example the simulated navigation system 320 only consists of the GPS receiver, then the status switch will let the guidance algorithm 340 know there is no navigation solution before the GPS has acquired a signal or after it has been jammed. The guidance algorithm 340 does not provide maneuver commands if there is no navigation solution present.

The simulated controller 360 receives the Maneuver Command as well as the estimated nose and body states, and from this generates a pulse-width modulation (PWM) command to be sent back to the simulated projectile 310, which ends up applying torque to the nose section. The subsystem of particular interest, and which includes modifications over known subsystems, is the navigation system 320, which will next be described in further detail. Details of the remaining subsystems are not of particular significance to the invention described herein and may be of conventional design well known to those of ordinary skill in this technology. Thus, in the interest of clarity the description of such remaining subsystems is not provided herein, except that of projectile 310.

Figure 4:
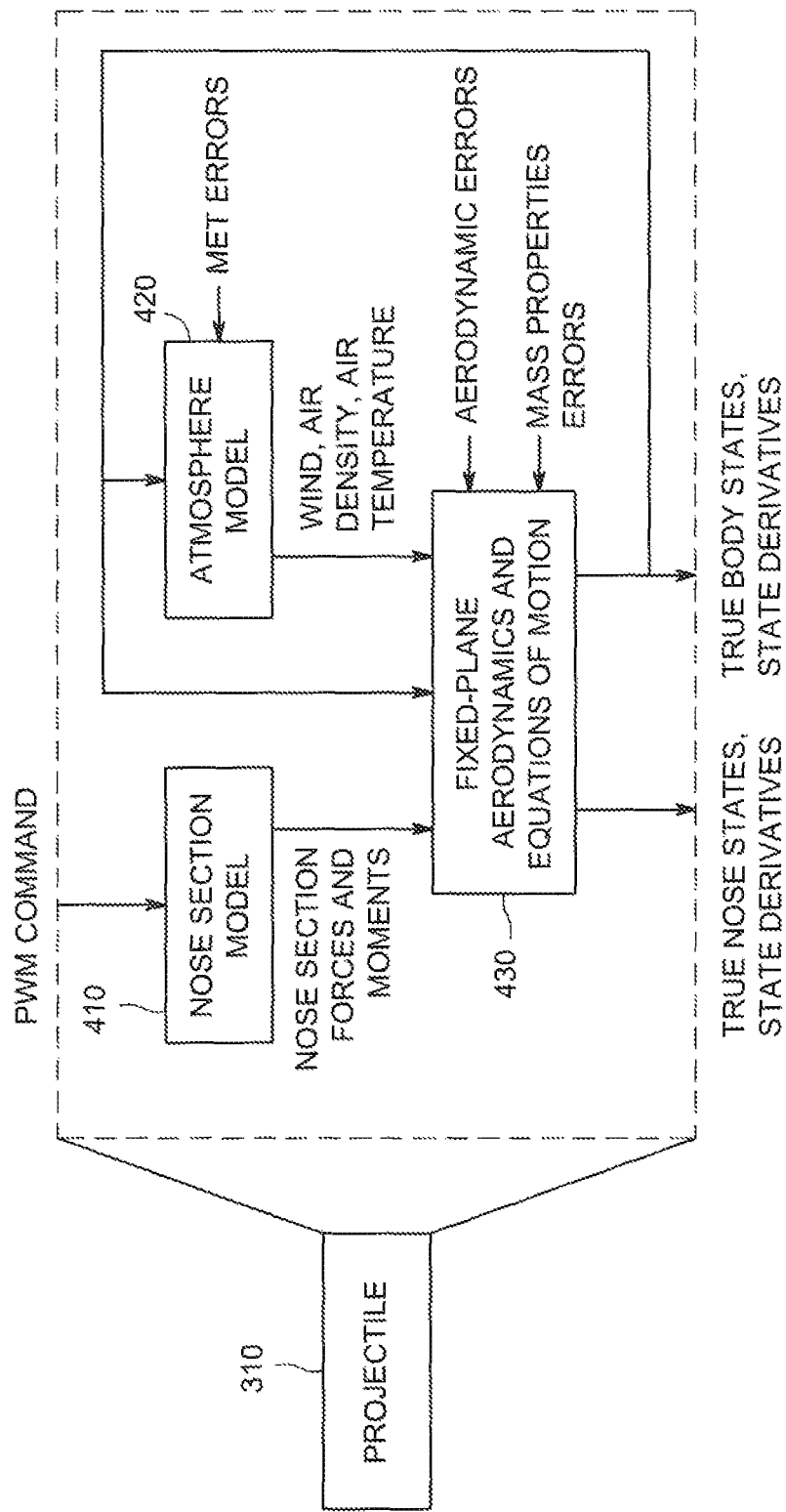
FIG. 4 illustrates a detailed depiction of the projectile module of FIG. 3, in accordance with exemplary embodiments of the present invention.

FIG. 4 illustrates the simulated projectile 310 of FIG. 3. The projectile 310 consists of several simulated sub models, namely, a nose section model 410 which computes the forces and moments that a motor of the projectile exerts on the nose and body sections due to the PWM command. An atmospheric model 420 uses a lapse-rate model to calculate air density and temperature as a function of altitude. Scale factors can be applied to the air density and temperature, and a constant wind model is used. In Monte Carlo analysis, the scale factors are drawn from a normal distribution with mean 1 and standard deviations provided in Table 1. The wind speed is normally distributed with mean 0, and the wind direction is a uniformly distributed azimuth angle from 0 to 360 degrees. Two sets of MET distributions were used for a coarse sensitivity analysis: a ½ hour stale MET and a 4 hour stale MET.

TABLE 1

Meteorological Data Error Budget

| Parameters | ½hr Stale MET 1σ Error | 4 hr Stale MET 1σ Error |
|---|---|---|
| Lapse rate model air density scale factor (%) | 0.5 | 2 |
| Lapse rate model air temperature scale factor (%) | 0.5 | 2 |
| Wind speed (m/s) | 1 | 3.5 |
| Wind direction (deg) | ~U(0-360) | ~U(0-360) |

Various data, as depicted in FIG. 4, is input into a Fixed-Plane Aerodynamics and Equations of Motions model 430 which computes and outputs true nose states, true body states, and their state derivatives. The aerodynamics and equations of motion for the projectile are similar to those listed in the paper by Fresconi, F.; Cooper, G. R.; Celmins, I.; DeSpirito, J.; Costelo, M., titled Flight Mechanics of a Novel Guided Spin-Stabilized Projectile Concept. *Journal of Aerospace Engineering* 2011, 226, 327-340, incorporated herein by reference. In this projectile model, the full non-linear flight dynamics are simulated using a continuous time solver. The outputs of equations of motion are the body state and state derivative vectors, as well as the nose section state and state derivative vectors. The projectile states include the position of the projectile (and therefore the origin of the fixed-plane and body-fixed frames) with respect to the gun frame viewed in the gun coordinates $r_{f/g}^g$, the velocity of the projectile with respect to the gun frame viewed in fixed-plane coordinates $v_{f/g}^f$, the angular velocity of the fixed-plane frame with respect to the gun frame viewed in fixed plane coordinates $\omega_{f/g}^f$, the spin rate $p_b$ (the spin rate is the x-component of the angular velocity of the body frame with respect to the gun frame), and the quaternion representing the attitude of the fixed-plane frame with respect to the gun frame $q_g^f$, e.g.

$$x_B = \begin{Bmatrix} r_{f/g}^g \\ v_{f/g}^f \\ \omega_{f/g}^f \\ p_b \\ q_g^f \end{Bmatrix}. \tag{9}$$

The nose states are also propagated forward in time, and include the nose-section roll angle with respect to the gun frame $\phi_n$, and the nose-section roll rate $p_n$ with respect to the gun frame, e.g.

$$x_N = \begin{Bmatrix} \phi_n \\ p_n \end{Bmatrix} \tag{10}$$

To represent either errors in the aerodynamic coefficient estimates, or aerodynamic variation from round to round, the aerodynamic coefficients where also varied in Monte-Carlo simulations. Each coefficient listed in Table 2 was scaled by a normally distributed random variable with mean 1 and standard deviation listed in the table. Further physical variation can be applied by scaling the mass properties using the error budget shown in Table 3. Finally the initial conditions can be varied using the error budget shown in Table 4. Because projectile simulation is well known to those of ordinary skill in this technology, in the interest of clarity, further description of the simulated projectile 310 is omitted.

TABLE 2

Aerodynamics Error Budget

| Coefficient | 1σ Error (%) |
|---|---|
| Axial force | 0.8602 |
| Normal force | 1 |
| Magnus force | 25 |
| Pitching moment | 2 |
| Pitch damping moment | 15 |
| Magnus moment | 15 |
| Roll damping moment | 5 |

TABLE 3

Mass Properties Error Budget

| Property | 1σ Error (%) |
|---|---|
| Mass (%) | 0.41 |
| CG distance from nose (%) | 0.12 |
| Axial moment of inertia (%) | 0.88 |
| Axial moment of inertia of the nose (%) | 0.88 |
| Transverse moment of inertia (%) | 0.71 |

TABLE 4

Launch Disturbance Error Budget

| Initial Condition | 1σ Error (%) |
|---|---|
| Gun azimuth deviation (mils) | 1.1662 |
| Gun elevation deviation (mils) | 0.5831 |
| Tipoff rate (q fixed plane) (rad/s) | 2 |

TABLE 4-continued

Launch Disturbance Error Budget

| Initial Condition | 1σ Error (%) |
|---|---|
| Tipoff rate (r fixed plane) (rad/s) | 2 |
| Muzzle Velocity (m/s) | 0.1 or 3.5 |

Figure 5:
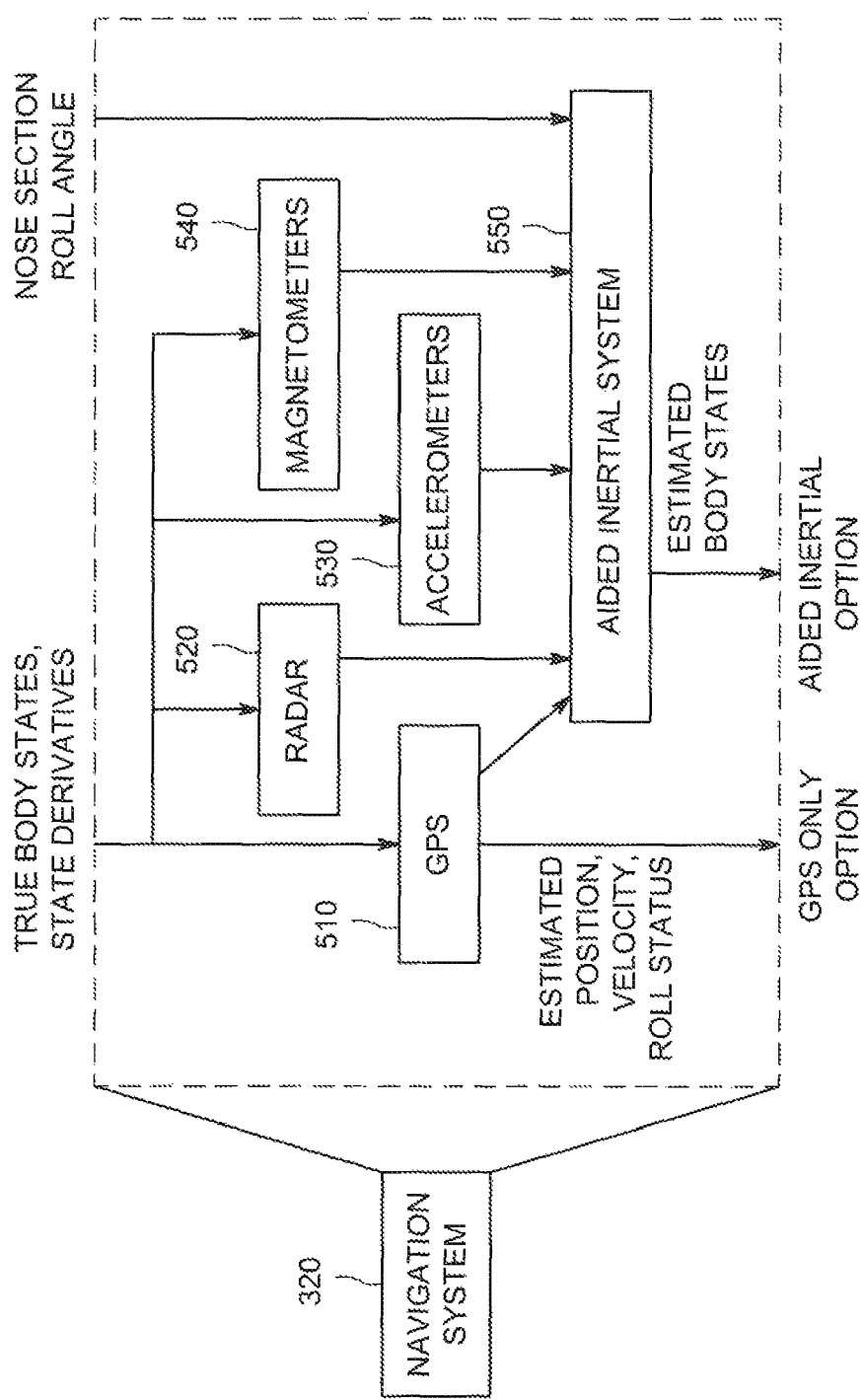
FIG. 5 illustrates a detailed depiction of the simulated navigation system of FIG. 3, in accordance with exemplary embodiments of the present invention.

FIG. 5 illustrates an overview of the simulated navigation system 320. The navigation system 320 first uses the true projectile body states and state derivatives output from the simulated projectile 310 to simulate the output of the sampled sensor systems. Then two navigation solutions are available, a GPS only solution and an aided inertial solution which, in accordance with the various embodiments of the present invention, provides accurate navigation in a GPS-denied environment. The GPS only solution uses the raw GPS signals obtained from a GPS receiver 510 in the guidance algorithm 340, while the aided inertial system 550 fuses signal from radar sensors (obtained from a radar receiver 520), if available, with signal output from accelerometer sensors 530 and magnetometer sensors 540 using a priori knowledge of flight dynamics. More specifically, the aided inertial system 550 uses flight dynamic modeling in combination with the accelerometer and magnetometer sensor signals from the projectile to develop estimated signals that are blended to develop position and velocity estimates of the projectile in flight, as next described. Since the embodiments described herein relate to a challenged environment, such as Radar and GPS-denied, in the interest of clarity, all description relating to the GPS receiver 510 and the Radar receiver 520 is omitted.

Figure 6:
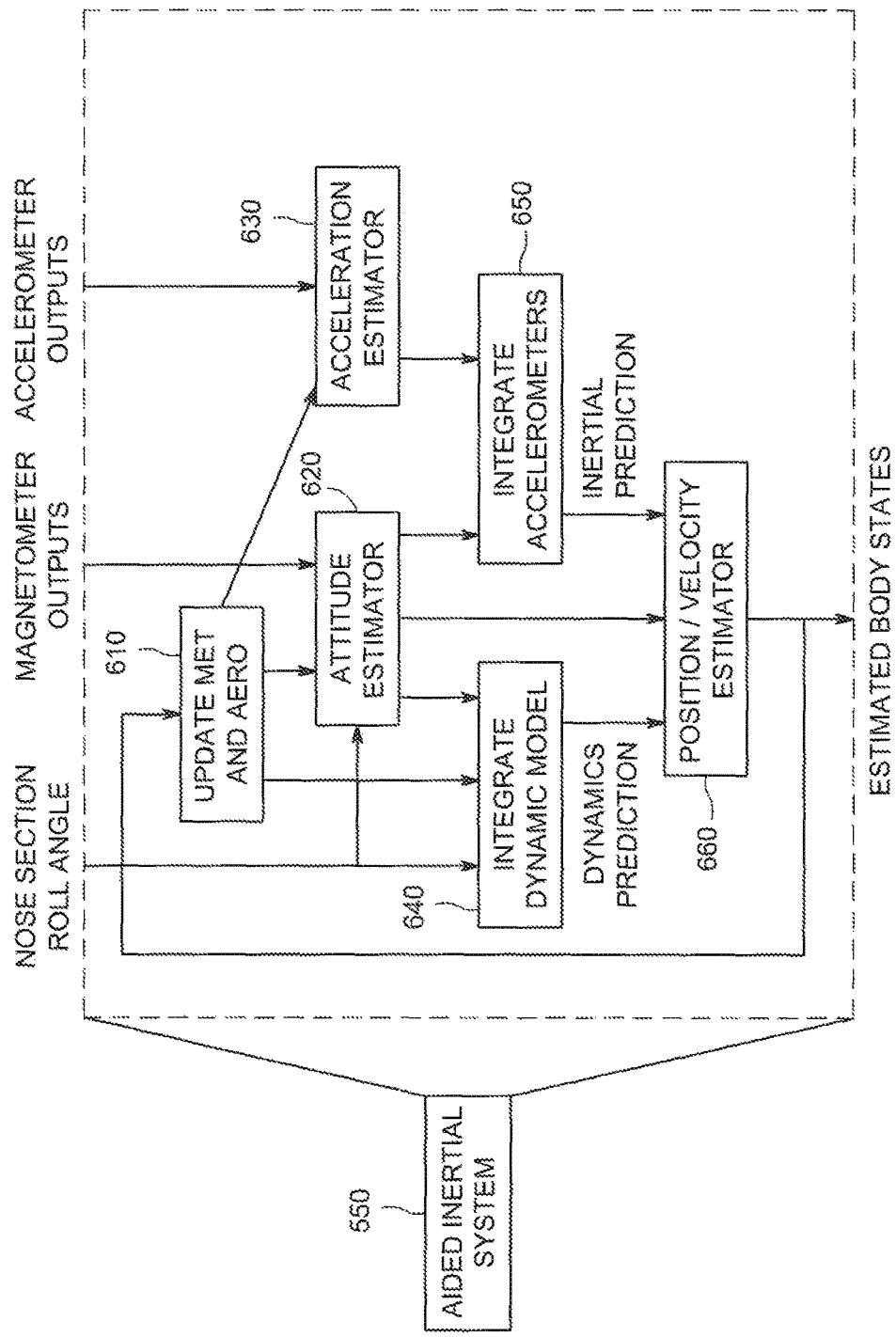
FIG. 6 depicts a top level illustration of an embodiment of the aided inertial system of FIG. 5, in accordance with exemplary embodiments of the present invention.

FIG. 6 is a top level illustration of an embodiment of the aided inertial system 550 of the navigation system 320 in accordance with exemplary embodiments of the present invention. The aided inertial system 550 includes an update meteorological and aerodynamics module 610, an attitude estimator 620, an acceleration estimator 630, an integrate dynamic model 640, an integrate accelerometers model 650, and a position/velocity estimator model 660. Atmospheric and aerodynamic estimates are used by the attitude estimator 620 and the integrate dynamic model 640. Output of the attitude estimator 620 is used by the acceleration estimator 630 and the integrate dynamic model 640. The acceleration estimator 630 conditions the output signals from the accelerometers 530 prior to entering the integrate accelerometers model 650. In accordance with embodiments of the invention, a Dynamics Prediction output from the integrate dynamic model 640 and an Inertial Predication output from the integrate accelerometers model 650 are blended in the position/velocity estimator model 660 to obtain the estimated position and velocity of the projectile in flight. Detail description for each of the attitude estimator 620, the acceleration estimator 630, the integrate dynamic model 640, the integrate accelerometers model 650 and the position/velocity estimator model 660 is provided below in conjunction with FIGS. 7-11.

The entire loop in FIG. 6 is simulated at a constant update rate of 1 kHz, which is high enough to be above the Nyquist rate for radial sensor signals, but not so fast as to be infeasible to implement on modem embedded processors. At the start of the loop, estimated Mach number and dynamic pressure are updated at the update meteorological and aerodynamics module 610 based on previous velocity and altitude estimates and nominal atmosphere models. The Mach number is used to update the aerodynamic coefficients that are used in several of the algorithms, as described in detail with respect to the following figures.

Figure 7:
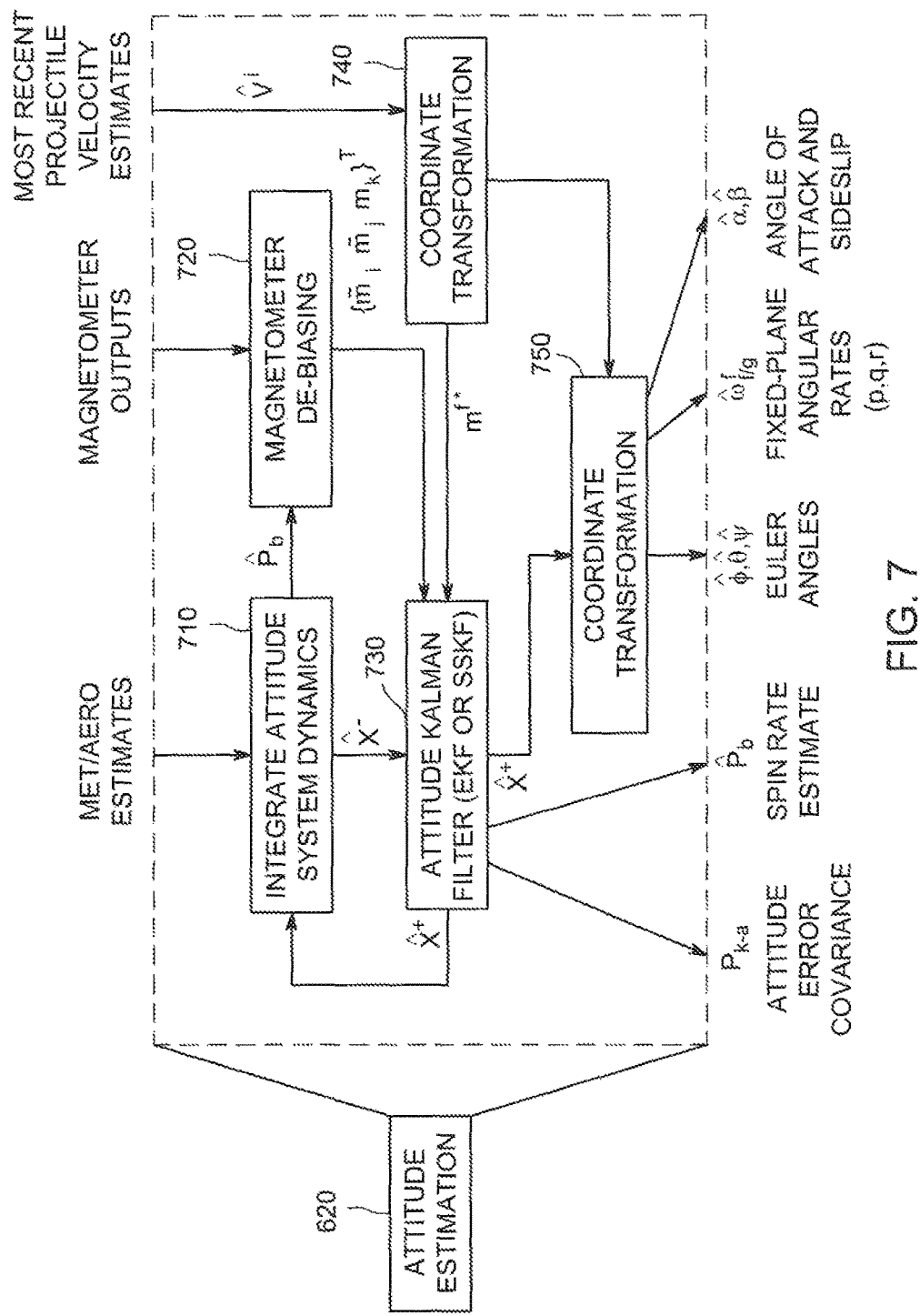
FIG. 7 is a top level illustration of an embodiment of the attitude estimator of FIG. 6.

FIG. 7 is a top level illustration of an embodiment of the attitude estimator 620 of FIG. 6. As an overview, it is noted that the attitude estimator 620 models the full transformation of the attitude of the projectile from gun frame to body frame as a sequence of quasi-steady state rotations followed by a set of transient rotations. The first steady state rotations are the projectile flight-path angles determined from the most recent projectile velocity estimate. Using the (assumed known) coordinates of the Earth's magnetic field in gun coordinates and the flight path angles, a further rotation is used to fully define a steady-state −S frame in a way that simplifies the transient system measurement equations. The transient states consist of the yaw, pitch and roll angles, as well as the projectile angular rates relative to the steady-state frame. The transient states are modeled as a dynamical system by an integrate attitude system dynamics model 710 using the projectile flight dynamics with some slight modifications. The system is integrated forward in time using an attitude Kalman filter 730 to obtain a state prediction $\hat{\xi}_k^-$. Before the output signals from the magnetometers 540 are used in the attitude Kalman filter 730, they go through a pre-processing Kalman filter in a magnetometer de-biasing filter 720 that removes the biases of magnetometers 540 that are radially positioned. The bias of the axially positioned magnetometer 540 is added to the primary state vector in the Attitude Kalman filter 730. The attitude Kalman filter 730 then uses the De-Blased magnetometer signals from 720 to obtain an updated state estimate $\hat{X}+(\hat{\xi}_k^+)$. In the steady-state −S frame, both the dynamic model and the measurement model of the attitude Kalman filter 730 can be linearized enough (by removing non-linear terms) so that a steady-state Kalman gain of filter 730 can be calculated with little effect on performance. The updated state vector undergoes additional coordinate transformations in 750 to obtain the Euler angles, fixed-plane angular rates, angles of attack and sideslip, and spin-rate used in other components of the aided inertial system 550.

More specifically, attitude estimator 620 of FIG. 7 consists of two separate fitters; one to remove the biases from the radial magnetometer signals and one to estimate the attitude states of the projectile. Accordingly, the Integrate attitude system dynamics model 710 uses rigid body dynamics to predict the states of the projectile. The output from tri-axial magnetometer sensors 540 are applied to the magnetometer de-biasing filter 720 responsive to the integrate attitude system dynamics model 710 so as to remove the bias from the radial magnetometer signals based on a periodicity assumption. This filter step is separate from the main attitude Kalman filter 730 both for computational efficiency and also so that the radial magnetometers can be transformed into a direct roll angle measurement external to the attitude Kalman filter 730. A previous projectile velocity vector estimate $(v_{k-1})$ is applied to a coordinate transformation module 740 to calculate a transformation to an intermediate coordinate system called the "pitch-plane" coordinate system. The objective of this coordinate system is to simplify the magnetometer measurement equation so that magnetometer measurements from magnetometer de-biasing filter 720 can be used as direct measurements of the states. The attitude states are also described in the pitch plane coordinate system, and state propagation equations are formed by transforming the projectile equations of motion obtained from the integrate attitude system dynamics model 710. At each time step, the predicted state estimates from 710 are updated with the magnetometer measurements using the attitude Kalman filter 730, which can either be an Extended Kalman Filter (EKF) or a Steady State Kalman Filter (SSKF). Updated MET/Aerodynamic estimates (610 of FIG. 6) are also provided to the attitude Kalman filter 730. The updated state estimates provided by the attitude Kalman filter 730 are then transformed back into the conventional attitude states via coordinate transformation module 750.

Figure 8:
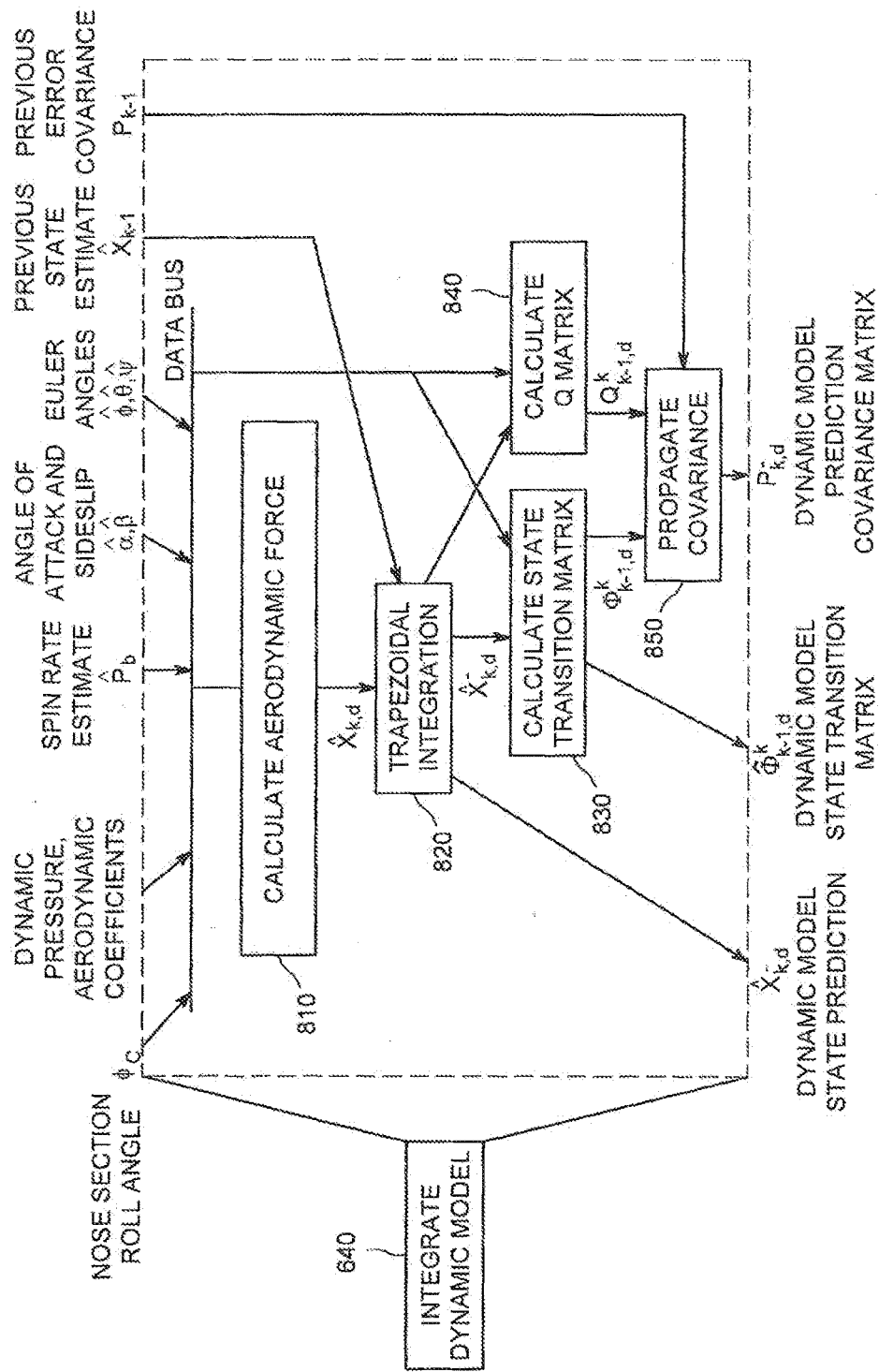
FIG. 8 illustrates an overall block diagram of the integrate dynamics model of FIG. 6, in accordance with exemplary embodiments of the present invention.

FIG. 8 illustrates an overview of the flight dynamics model 640 of FIG. 6. The basic premise of the heuristic methodology used herein is that because the flight dynamics of a projectile are so well known, using them in the aided inertial system 550 should improve its accuracy. To this end, the position and velocity at each time step are predicted using a flight dynamics model which makes use of the spin rate, angle of attack, and sideslip estimates from the attitude estimator 620 to directly calculate the aerodynamic forces on the projectile, via the calculate aerodynamic forces model 810. The flight dynamics model 640 described herein is different from known models in that angle-of-attack estimates (from attitude estimator 620) are used in the calculation of the aerodynamic forces. In the calculate aerodynamic forces model 810 the scalar components of the aerodynamic forces in the fixed-plane frame are calculated using the following equations:

$$\alpha_C = \sin^{-1}(\alpha\cos(\phi_C) + \beta\sin(\phi_C)) \quad (11)$$

$$F_x^f = \bar{q}A\left(-C_{X_0} - C_{X_{\alpha^2}}\bar{\alpha}^2\right)$$

$$F_y^f = \bar{q}A\Big(C_{N_\alpha}\beta + C_{N_{\alpha^3}}\beta^3 +$$

$$\left(C_{Y_{p\alpha}}\frac{p_b D}{2V}\right)\alpha + C_{Z_{0_C}}\sin(\phi_C) - \cos(\phi_C)C_{Y_{\alpha_C}}\alpha_C\Big)$$

$$F_z^f = \bar{q}A\Big(-C_{N_\alpha}\alpha - C_{N_{\alpha^3}}\alpha^3 + \left(C_{Y_{p\alpha}}\frac{p_b D}{2V}\right)\beta -$$

$$C_{Z_{0_C}}\cos(\phi_C) - \sin(\phi_C)C_{Y_{\alpha_C}}\alpha_C\Big)$$

Using the attitude estimates and accounting for gravity and Coriolis effects (calculated using previous state estimates), these forces are transformed into accelerations in the gun-frame during integration by a trapezoidal integration model 820, which in turn drive the state derivative:

$$\dot{x}_d = \begin{Bmatrix} \dot{r}_{f/g}^g \\ \dot{v}_{f/g}^g \end{Bmatrix} \quad (12)$$

$$= \begin{Bmatrix} v_{f/g}^g \\ \frac{1}{m}R_f^g\{F_x^f \ F_y^f \ F_z^f\}^T \end{Bmatrix} + \begin{Bmatrix} 0 \\ g'^g - \gamma^g \end{Bmatrix}$$

The accelerations are integrated forward in time once by the trapezoidal integrator 820 to obtain a velocity prediction and integrated forward in time a second time by the trapezoidal integrator 820 to obtain a position prediction (thus obtaining the Dynamic Model State Prediction).

Figure 11:
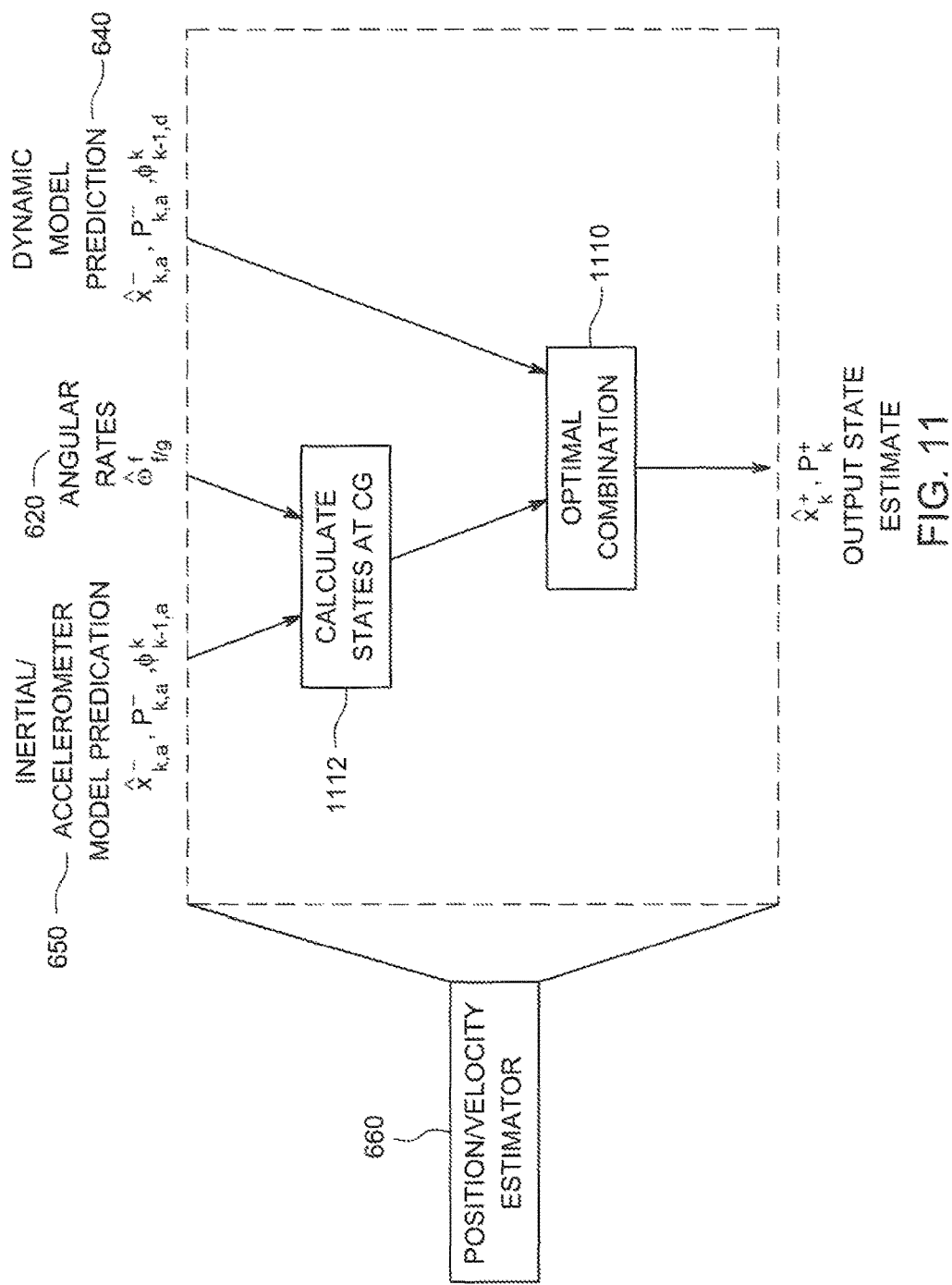
FIG. 11 illustrates the overall block diagram of the position/velocity estimator of FIG. 6, in accordance with exemplary embodiments of the present invention.

In addition to integrate dynamic model 640 producing a prediction of the state vector, an approximate error-state transition matrix, process noise covariance matrix, and prediction error covariance matrix are produced as well, as it is possible to use this information to optimally blend the state prediction with other predictions or measurements, as will be shown in conjunction with FIG. 11. Thus, a calculate state transition matrix 830, responsive to the Dynamic Model State Prediction, approximates a state transition matrix by numerical differentiation:

$$\Phi_{k,d}^{k-1}(x,\Delta t) \cong \frac{\partial(x+\dot{x}\Delta t)}{\partial x}\bigg|_{x=\frac{\hat{x}_{k,d}+\hat{x}_{k-1}}{2}} \quad (13)$$

The process noise covariance is approximated by:

$$Q_{k-1,d}^k = \int_0^{\Delta t}\Phi_{k-1}^k(\Delta t-\tau)Q_c\Phi_{k-1}^{kT}(\Delta t-\tau)d\tau \quad (14)$$

using a calculate Q matrix model 840 also responsive to the Dynamic Model State Prediction. The matrix $Q_c$ is a diagonal matrix intended to represent the spectral density of the errors in the dynamic model. The diagonal elements are chosen manually so that the uncertainty bounds from the error covariance matrix roughly approximate the observed errors in simulation. Using the matrices provided by models 830 and 840, the state error covariance is propagated by a propagate covariance model 850 to obtain the covariance of the errors in the dynamic model prediction:

$$P_{k,d}^- = \Phi_{k-1,d}^k P_{k-1,d}\Phi_{k-1,d}^{kT} + Q_{k-1,d}^k \quad (15)$$

Figure 9:
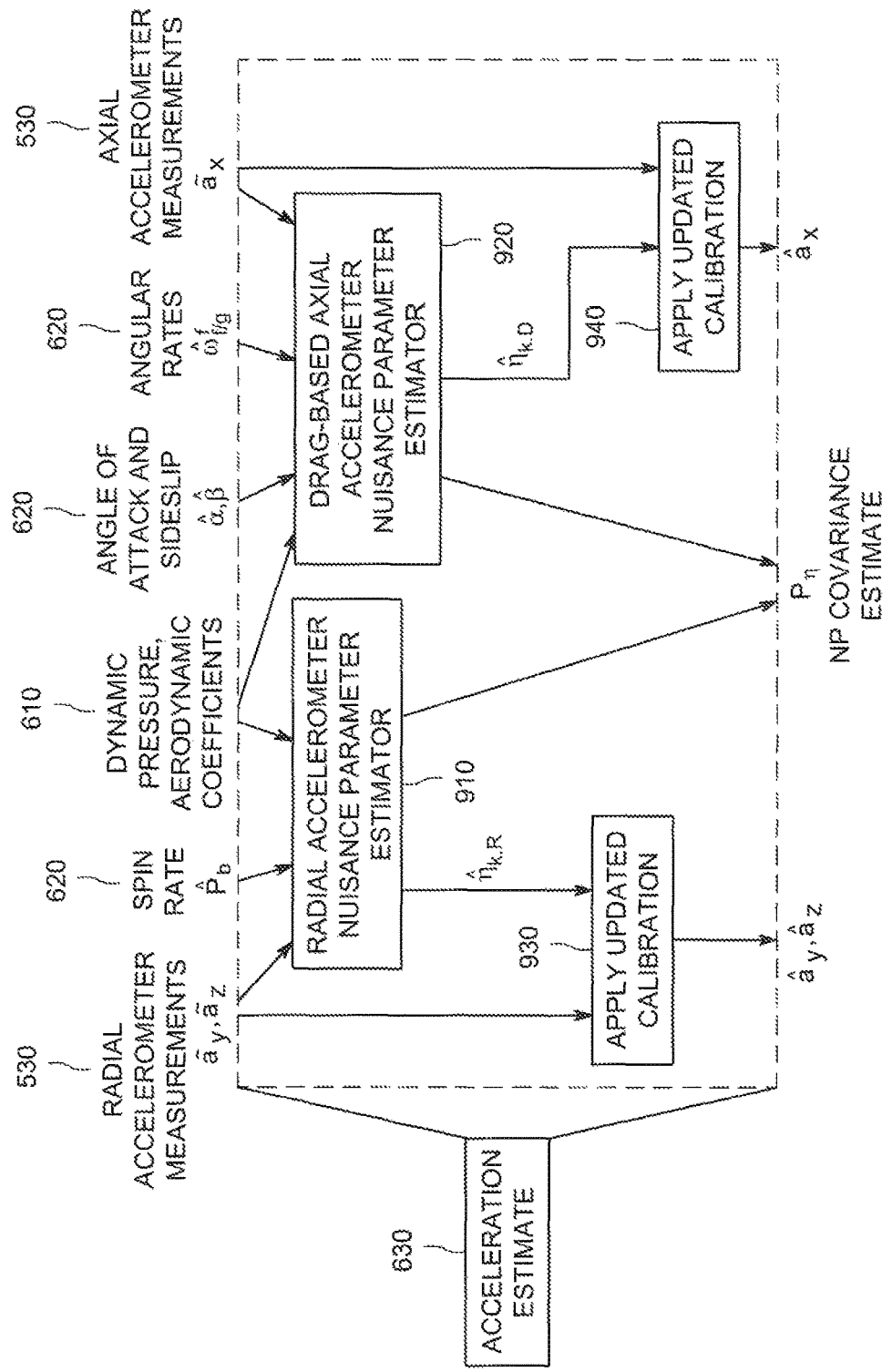
FIG. 9 illustrates an overall block diagram of the acceleration estimator of FIG. 6, in accordance with exemplary embodiments of the present invention.

FIG. 9 illustrates the overall block diagram of the acceleration estimator 630 of FIG. 6, in accordance with exemplary embodiments of the present invention. As previously described, the raw outputs from the accelerometers contain calibration errors and signals from centripetal accelerations. In order to integrate something closer to the actual acceleration of the projectile 310, and thereby obtain a more accurate navigation system, in accordance with the exemplary embodiments nuisance parameter (NP) estimators are used to correct the raw accelerometer outputs by estimating their dominant error terms. The dominant error terms in each accelerometer are a constant bias and a constant times the square of the spin-rate. A radial accelerometer NP estimator 910 and axial accelerometer NP estimator 920 are decoupled into two separate estimators, since no coupling exists between the two NP system models.

The radial accelerometer NP estimator 910 models the ideal acceleration signals as two sinusoids of the same amplitude that are 90 degrees out of phase. The nuisance parameters are composed of a constant bias, and a $cp_b^2$ term, whose dynamics are dictated by the dynamic pressure and spin-damping coefficient. Although it is possible to model the NP state as just the c term and account for the $p_b^2$ in the measurement equation, modeling the state as $cp_b^2$ allows for near time invariance in the linear system model. This allows a steady-state Kalman gain to be calculated for computational savings. The measured accelerometer signals are modeled as a linear superposition of the ideal accelerometer signals and the NP states. This forms a linear system which can be observed with a Kalman filter. From an integration standpoint, these NP errors will produce no measurable effect on the velocity and position estimates. However, in order to apply corrections for the output filter magnitude and phase response, it is necessary to calculate the unbiased acceleration signals.

One way for estimating the axial accelerometer nuisance parameters is a drag-based approach. In the drag-based approach, carded out by estimator 920, the ideal axial acceleration is modeled by the axial deceleration due to drag in addition to the centripetal acceleration due to the pitch and yaw rates e.g.

$$a_x = \frac{F_x^f}{m} + \Delta x(q^2 + r^2) \quad (16)$$

The difference between the ideal axial acceleration (equation 16 above) and the measured axial acceleration from the accelerometer 530 of FIG. 5 is then used as a direct measurement of the bias, which is also composed of a constant b and $cp_b^2$ term. It is noted that while tangential accelerations are present in sensors located off of the spin axis, they are periodic with high frequency content. They are zero-mean and have no net effect when integrated, so they are neglected in the estimator design.

More specifically, accelerometers mounted in a projectile in atmospheric flight measure the specific aerodynamic force in the body frame. The aerodynamic forces encountered during flight depend on the atmosphere (e.g., density, wind) and flow around the projectile (e.g., Mach number, angle of attack). An expression for ideal accelerometer measurements located at an arbitrary point in the projectile body follows.

$$\vec{a}_M^B = \frac{1}{m}\vec{F}_A + \vec{\omega}_{B/I} \times \vec{r}_{CG \to M} + \vec{\omega}_{B/I} \times \vec{\omega}_{B/I} \times \vec{r}_{CG \to M} \quad (17)$$

Ideal accelerometer signals are corrupted in practical transduction devices by errors in scale factor, misalignment, cross axis sensitivity, misplacement, bias, and noise. Modeling these terms provides the following relationship for the specific force at the center of gravity (CG) measured by a real-world accelerometer.

$$\vec{a}_{CG}^B = \bar{S}_M \bar{T}_{MB} \left[ \frac{1}{m}\vec{F}_A + \vec{\omega}_{B/I} \times (\vec{r}_{CG \to M} + \vec{\varepsilon}_{r_{CG \to M}}) + \vec{\omega}_{B/I} \times \vec{\omega}_{B/I} \times (\vec{r}_{CG \to M} + \vec{\varepsilon}_{r_{CG \to M}}) + \vec{\varepsilon}_B + \vec{\varepsilon}_N \right] \quad (18)$$

MEM accelerometers offer enormous advantages in terms of device size, gun-launched survivability, and cost due to economies of scale. These devices are improving performance drastically but still often fall short of guided-projectile requirements for inertial navigation.

After neglecting scale factor, misalignment, and nonorthogonality errors, an expression for the error in the accelerometer measurement at the CG may be obtained through a simple difference:

$$\vec{e}_{\vec{a}_{CG}^B} = \vec{\omega}_{B/I} \times \vec{\varepsilon}_{r_{CG \to M}} + \vec{\omega}_{B/I} \times \vec{\omega}_{B/I} \times \vec{\varepsilon}_{r_{CG \to M}} + \vec{\varepsilon}_B + \vec{\varepsilon}_N \quad (19)$$

The measurement error in equation 19 can be manipulated for the spin-stabilized projectile application. Gyroscopic action is used to stabilize statically unstable projectiles. High projectile spin rates are necessary for achieving gyroscopic stability. Therefore, the spin rate is much higher than pitch and yaw rates (p>>q, r) and dominates the centripetal acceleration term in equation 19. In contrast, the spin rate deceleration is very small compared with the other components of angular acceleration. However, the radial components are perfectly periodic with roll rate, and therefore have no net effect on accelerometer integration, so the tangential acceleration term is neglected. Using these assumptions, the equation for the error in the accelerometer measurement at the CG may be simplified to the following form.

$$e_{\vec{a}_{CG}^B} = cp^2 + b \quad (20)$$

This equation lumps some individual error parameters (e.g., scale factor, misalignment, bias) together into two separate terms, and uses an estimate of spin rate to model critical features of accelerometer errors for spin-stabilized projectiles.

As noted above, spin-stabilized flight dynamics may also be leveraged in modeling lateral accelerometers. The triaxial accelerometers are mounted orthogonally with the principal axis of one accelerometer along the spin axis of the projectile (axial accelerometer), and the principal axes of the other two accelerometers oriented to complete a right-hand coordinate system (lateral accelerometers). For right-hand spun projectiles, the lateral accelerometer signals resemble sine waves with the J axis measurement lagging the K axis measurement by 90°. Over one revolution of spin the lateral accelerations have zero mean during ballistic portion of flight. Lateral accelerometers are modeled with a parameter for the amplitude and using the appropriate sine/cosine function of spin rate since spin rate does not change appreciably over a revolution.

Axial acceleration is driven by drag. Flight mechanics and high-fidelity aerodynamic characterization is applied to estimate the specific axial force to within yaw-dependent axial force (usually small), manufacturing tolerances (e.g., mass, drag coefficient) and atmospheric uncertainties (e.g., density, wind) when velocity is obtained in flight.

$$a_i = -\frac{\pi}{8m}\rho D^2 C_X V^2 \quad (21)$$

Accordingly, equation 21 provides a heuristic-based calculation for nuisance parameter estimation by the axial accelerometer nuisance parameter estimator 920.

To perform either of radial or axial nuisance parameter estimation, an extended Kalman filter was created. The Kalman filter combines a process model and a current radial or axial measurement to develop at an output an optimal current estimate. The accelerometer model development for the spin-stabilized projectile environment outlined previously was incorporated into the estimator design. The state vector for the nuisance parameters are therefore the lateral accelerations, constant biases, and biases related to the roll rate squared, as shown below in equation 22. The state vector for the nuisance parameters of the radial accelerometers are estimated by radial NP estimator 910 by the j and k terms of equation 22 and the nuisance parameters of the axial accelerometers are estimated by axial NP estimator 920 by the i terms of equation 22, $$\vec{X} = \begin{Bmatrix} a_j \sin(pt) \\ a_k \cos(pt) \\ b_i \\ b_j \\ b_k \\ (cp^2)_i \\ (cp^2)_j \\ (cp^2)_k \end{Bmatrix} \quad (22)$$

The radial and axial accelerometer measurement signals are supplied by the tri-axial accelerometers 530.

$$\vec{Y} = \vec{a}_{CG}^B \quad (23)$$

The nuisance parameter state propagation equations are as follows, where A is the state transition matrix, which is then integrated forward in time to obtain the prediction.

$$\vec{X} = \vec{A}\vec{X} \quad (24)$$

$$\vec{A} = \begin{bmatrix} 0 & p & 0 & 0 & 0 & 0 & 0 & 0 \\ -p & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & \left(\frac{2}{p}\dot{p}\right) & 0 & 0 \\ 0 & 0 & 0 & 0 & 0 & 0 & \left(\frac{2}{p}\dot{p}\right) & 0 \\ 0 & 0 & 0 & 0 & 0 & 0 & 0 & \left(\frac{2}{p}\dot{p}\right) \end{bmatrix} \quad (25)$$

Projectile roll dynamics may be applied to obtain spin acceleration $$\left(\dot{p} = \frac{\pi \rho V D^4 C_{l_p} p}{16}\right).$$

In discrete time, the state propagation matrix is:

$$\vec{F} = e^{\vec{A}\Delta t} \quad (26)$$

$$\vec{F} \approx \begin{bmatrix} \cos(p\Delta t) & \sin(p\Delta t) & 0 & 0 & 0 & 0 & 0 & 0 \\ -\sin(p\Delta t) & \cos(p\Delta t) & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1+\frac{2\dot{p}}{p}\Delta t & 0 & 0 \\ 0 & 0 & 0 & 0 & 0 & 0 & 1+\frac{2\dot{p}}{p}\Delta t & 0 \\ 0 & 0 & 0 & 0 & 0 & 0 & 0 & 1+\frac{2\dot{p}}{p}\Delta t \end{bmatrix} \quad (27)$$

Between measurement updates, the state and covariance are propagated according to the following expressions.

$$X_k^- = F_{k-1} X_{k-1}^+ \quad (28)$$

$$P_k^- = F_{k-1} P_{k-1}^+ F_{k-1}^T + Q_{k-1} \quad (29)$$

A simplified model of the accelerometers is proposed based on modeling of the aforementioned in-flight measurements.

$$\vec{Y}^* = \begin{bmatrix} a_i + b_i + (cp^2)_i \\ a_j \sin(pt) + b_j + (cp^2)_j \\ a_k \cos(pt) + b_k + (cp^2)_k \end{bmatrix} \quad (30)$$

The relationship between the measurement model and the nuisance parameter states can be obtained from a partial derivative.

$$\vec{H} = \left[ \left(\frac{\partial \vec{Y}^*}{\partial (a_j \sin(pt))}\right) \left(\frac{\partial \vec{Y}^*}{\partial (a_k \cos(pt))}\right) \left(\frac{\partial \vec{Y}^*}{\partial b_i}\right) \left(\frac{\partial \vec{Y}^*}{\partial b_j}\right) \left(\frac{\partial \vec{Y}^*}{\partial b_k}\right) \left(\frac{\partial \vec{Y}^*}{\partial (cp)_i}\right) \left(\frac{\partial \vec{Y}^*}{\partial (cp)_j}\right) \left(\frac{\partial \vec{Y}^*}{\partial (cp)_k}\right) \right] \quad (31)$$

And the resulting measurement matrix is $$\vec{H} = \begin{bmatrix} 0 & 0 & 1 & 0 & 0 & 1 & 0 & 0 \\ 1 & 0 & 0 & 1 & 0 & 0 & 1 & 0 \\ 0 & 1 & 0 & 0 & 1 & 0 & 0 & 1 \end{bmatrix} \quad (32)$$

The Kalman gain, state, and NP covariance estimate are updated at each measurement.

$$\vec{K}_k = \vec{P}_k^- \vec{H} (\vec{H}\vec{P}_k^- \vec{H} + \vec{R})^{-1} \quad (33)$$

$$\vec{X}_k^+ = \vec{X}_k^- + \vec{K}_k \left[ \vec{Y} - \left( \vec{H}\vec{X}_k^- + \begin{bmatrix} a_i \\ 0 \\ 0 \end{bmatrix} \right) \right] \quad (34)$$

$$\vec{P}_k^+ = (\vec{I} - \vec{K}_k \vec{H}) \vec{P}_k^- \quad (35)$$

The above equations are carried out by radial NP estimator 910 and axial NP estimator 920.

Finally, the accelerometer measurement signals 530 are compensated using these nuisance parameters. Thus, the outputs of the radial NP estimator 910 and axial NP estimator 920 are applied, respectively, to update calibration modules 930 and 940 to update the current signals with the NP estimation, so as to correct/calibrate them for axial and radial acceleration as follows:

$$\hat{a}_{CG}^B = \vec{Y} - \vec{Y}^* \quad (36)$$

Figure 10:
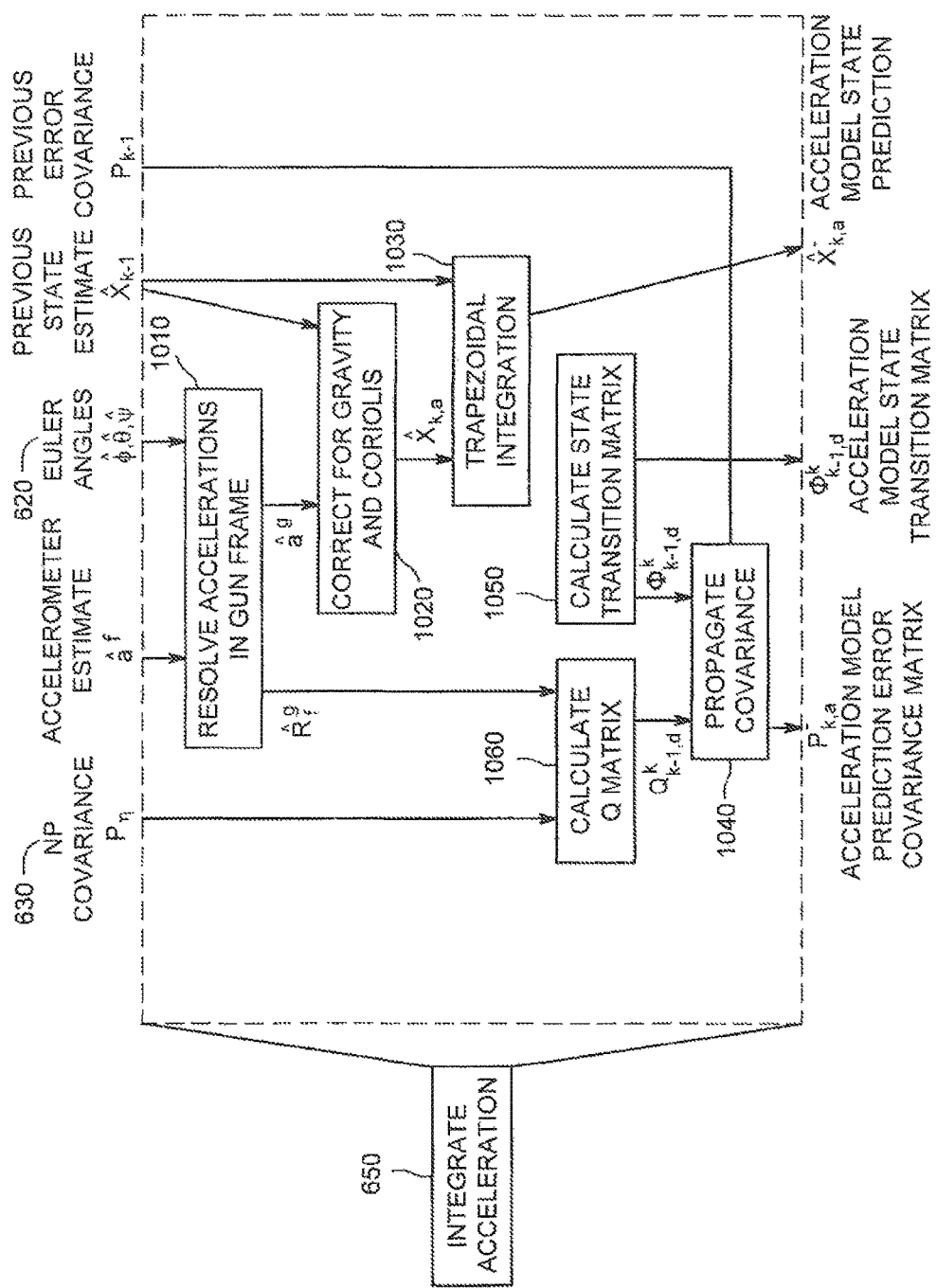
FIG. 10 illustrates an overall block diagram of the integrate accelerometers model of FIG. 6, in accordance with exemplary embodiments of the present invention.

FIG. 10 illustrates the overall block diagram of the integrate accelerometers model 650 of FIG. 6. In model 650 the body acceleration of the CO is transformed into the inertial frame by model 1010 and the force of gravity is added by for inertial navigation.

$$\vec{a}_{CG}^I = \vec{T}_{BI} \hat{a}_{CG}^B + \vec{g} \quad (37)$$

Previous position and velocity estimates are used by correction model 1020 to estimate the gravity and Coriolis terms. A trapezoidal numerical integration scheme is applied by model 1030 to obtain inertial velocity and position from this acceleration. Initial velocity and position are necessary. Thus, the accelerometer signals are integrated to produce the velocity and position predictions. In order to perform this task, the Euler angles from the attitude estimator 620 are used by resolve accelerations model 1010 to resolve the fixed-plane acceleration measurements in the gun-frame. It is impossible to directly calculate the acceleration of the projectile CG, because doing so would require measurements of the angular acceleration. Instead, the acceleration of the accelerometer is integrated directly by trapezoidal integrator 1030 to yield a prediction of the accelerometer frame velocity and position, e.g.

$$\hat{v}^g_{a/g,k} = \hat{v}^g_{a/g,k-1} + \Delta t \left[ \frac{\hat{R}^g_{f,k-1}\hat{a}^f_{k-1} + \hat{R}^g_{f,k}\hat{a}^f_k}{2} + \hat{g}'^g - \hat{\gamma}^g \right] \quad (38)$$

$$\hat{r}^g_{a/g,k} = \hat{r}^g_{a/g,k-1} + \Delta t \left[ \frac{\hat{v}^g_{a/g,k-1} + \hat{v}^g_{a/g,k}}{2} \right]$$

To estimate uncertainty, the covariance of the state errors is propagated by a covariance model 1040. A perturbation analysis is performed assuming the numerical errors from trapezoidal integration are small compared to the errors from noise and accelerometer nuisance parameter estimates. This resulted in linear mappings to the state errors at the current iteration[1]:

$$\begin{Bmatrix} \Delta \hat{r}^g_{a/g,k} \\ \Delta \hat{v}^g_{a/g,k} \end{Bmatrix} \cong \begin{bmatrix} I & I\Delta t \\ 0 & I \end{bmatrix} \begin{Bmatrix} \Delta \hat{r}^g_{a/g,k-1} \\ \Delta \hat{v}^g_{a/g,k-1} \end{Bmatrix} + \quad (39)$$

$$\begin{bmatrix} I\frac{\Delta t^2}{2} \\ I\Delta t \end{bmatrix} \hat{R}^g_{f,k} B_k \Delta \eta_k + \begin{bmatrix} I\frac{\Delta t^2}{2} \\ I\Delta t \end{bmatrix} \hat{R}^g_{f,k} \frac{n_{a,k} + n_{a,k-1}}{2}$$

Because the accelerometer nuisance parameters have been estimated already, the NP estimates for the current time step can be applied to both the current and previous accelerometer signals. In the case where a steady-state Kalman filter is used for the radial accelerometer nuisance parameters, a decreasing weight can be experimentally chosen instead of an actual covariance.

The matrix $B_k$ is a linear mapping from the errors in the nuisance parameter estimates to errors in body-fixed accelerations. A state transition matrix is constant and is calculated by a calculate state transition matrix model 1050, and an error covariance matrix generated by calculate Q matrix 1060 is given by:

$$Q^k_{k-1,a} = \begin{bmatrix} I\frac{\Delta t^2}{2} \\ I\Delta t \end{bmatrix} \hat{R}^g_{f,k} \left( B_k P_{k,\eta} B^T_k + \frac{\text{Cov}(n_a)}{2} \right) \hat{R}^{gT}_{f,k} \begin{bmatrix} I\frac{\Delta t^2}{2} & I\Delta t \end{bmatrix} \quad (40)$$

FIG. 11 illustrates the overall block diagram of the position/velocity estimator model 660 of FIG. 6. The primary goal of the aided inertial system 550 is to provide the best possible estimate of the current position and velocity of the projectile. The integrate accelerometer model 650 of FIG. 6 and the Integrate dynamic model 640 of FIG. 6 both produce independent predictions of the position and velocity states. It is known to be possible to blend either of these predictions with measurements from GPS or radar, however, heretofore, it is not known to blend them with each other in an optimal manner, that is, in a manner so that the combined state estimate has the smallest variance.

Thus, in accordance with embodiments of the invention, an optimal combination model 1110 develops an optimal combined state estimate $\hat{x}_{k,c}^-$ from the inertial/accelerometer prediction from model 650 and the dynamic model prediction from model 640 according to the expression:

$$\hat{x}_{k,c}^- = \hat{x}_{k,d}^- + L(\hat{x}_{k,a}^- - \hat{x}_{k,d}^-) \quad (41)$$

It is noted that before optimal blending by model 1110, the inertial/accelerometer prediction is applied to calculate states at CG model 1112 so as to calculate the states at the center of gravity of the projectile.

If the state estimates are continuously blended throughout the flight, the gain L is given by:

$$L = (P_{k,d}^- - \Phi_{k-1,d}{}^k P_{k-1} \Phi_{k-1,a}{}^k)(P_{k,d}^- + P_{k,a}^- - \Phi_{k-1,d}{}^k P_{k-1} \Phi_{k-1,d}{}^k - \Phi_{k-1,a}{}^k P_{k-1} \Phi_{k-1,a}{}^k)^{-1} \quad (42)$$

The covariance of the combined state estimate is then updated and provided as an output by the optimal combination model 1110 as:

$$P_{k,c}^- = P_{k,d}^- - L(P_{k,d}^- - \Phi_{k-1,a}{}^k P_{k-1} \Phi_{k-1,d}{}^k) \quad (43)$$

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

What is claimed is:

1. A method for navigation of a spin-stabilized projectile comprising:
   receiving current measurement signals from tri-axially positioned magnetometer sensors mounted on the projectile and from tri-axially positioned accelerometer sensors mounted on the projectile;
   developing estimated attitude signals of the projectile from the current measurement signals received from the magnetometer sensors;
   developing a flight dynamic prediction of the position and velocity of the projectile using the estimated attitude signals;
   developing an inertial prediction of the position and velocity of the projectile using the current measurement signals received from the accelerometer sensors and the estimated attitude signals;
   combining the flight dynamic prediction and the inertial prediction to generate estimated current position and velocity states for the projectile by optimal estimation; and applying the estimated current position and velocity states for navigation of the projectile.

2. The method of claim 1, wherein developing estimated attitude signals includes a transformation from an inertial gun to target frame to a projectile body-fixed frame.

3. The method of claim 1, wherein developing estimated attitude signals includes an algorithm using flight dynamic modeling.

4. The method of claim 3, wherein the flight dynamic modeling assumes that a spin rate of the projectile is much faster than a yaw rate of the projectile, so as to estimate radial magnetometer nuisance parameters.

5. The method of claim 1, wherein developing estimated attitude signals includes an algorithm that uses flight dynamics in a process model having magnetometer and inertial velocities for measurements.

6. The method of claim 5, wherein developing estimated attitude signals includes an algorithm providing a steady state Kalman filter which speeds up run time through linearizing of the process and measurement models.

7. The method of claim 1, wherein developing a flight dynamic prediction of the position and velocity estimation of the projectile is achieved using flight dynamics in a process model and propagating state and covariance forward in time without measurement updates.

8. The method of claim 7, wherein the process model uses spin rate, angle of attack, and sideslip estimates from the estimated attitude signals to directly calculate aerodynamic forces on the projectile.

9. The method of claim 8, wherein the calculated aerodynamic forces on the projectile are processed in combination with the estimated attitude signals and integrated forward in time by a trapezoidal integrator to obtain a velocity prediction and integrated forward in time a second time by the trapezoidal integrator to obtain a position prediction, which velocity prediction and position prediction comprise the flight dynamic prediction.

10. The method of claim 1, wherein developing an inertial prediction includes nuisance parameter estimation in the measurement signals of accelerometer sensors that are radially mounted on the projectile.

11. The method of claim 10, where the radial nuisance parameter estimation uses flight dynamic modeling that assumes that dominant error terms in the measurement signals of the accelerometer sensors are determined to be a constant bias and a constant times the square of a spin-rate of the spin-stabilized projectile.

12. The method of claim 1, wherein developing an inertial prediction includes nuisance parameter estimation in the measurement signal of an accelerometer sensor that is axially mounted on the spin-stabilized projectile.

13. The method of claim 12, wherein the axial nuisance parameter estimation is achieved using flight dynamic modeling that assumes a drag equation for the body of the spin-stabilized projectile.

14. The method of claim 12, wherein the axial nuisance parameter estimation uses flight dynamic modeling that assumes that dominant error terms in the measurement signal of the axial accelerometer sensor are determined to be a constant bias and a constant times the square of a spin-rate of the spin-stabilized projectile.

15. The method of claim 1, wherein combining includes formulating two process models, one for the flight dynamic predictions and one for the inertial predictions.

16. The method of claim 15 where optimal estimation comprises combining the two process models to develop a combined prediction that has a minimum variance.

17. The method of claim 16, wherein the derivation and implementation of an optimal estimation using two process models and no measurements is achieved within the theoretical framework of a discrete Kalman filter.

18. An apparatus for navigation of a spin-stabilized projectile comprising:
at least one tri-axial magnetometer sensor and one tri-axial accelerometer sensor mounted on the spin-stabilized projectile for supplying current accelerometer and current magnetometer measurement signals,
an attitude estimator responsive to the current magnetometer measurement signals to develop attitude estimation signals for the spin-stabilized projectile;
an attitude integrator responsive to the attitude estimation signals to develop a flight dynamic prediction of the position and velocity of the spin-stabilized projectile,
an acceleration integrator responsive to the acceleration measurement signals to develop an inertial prediction of the position and velocity of the spin-stabilized projectile,
a process model combiner for combining two process models, one for the flight dynamic prediction and one for the inertial prediction, to generate estimated current position and velocity states for the spin-stabilized projectile, and
a guidance and control algorithm for processing the estimated current position and velocity states for the projectile to develop control signals for navigating course corrections for the spin-stabilized projectile.

19. The apparatus of claim 18, wherein the attitude estimator includes a coordinate transformation model for transforming signals from an inertial gun to target frame to a projectile body-fixed frame.

20. The apparatus of claim 18, wherein the process model combiner develops an optimal estimation by combining the dynamic and inertial predictions in a manner so as to have a minimum variance.

* * * * *